US009835865B2

(12) United States Patent
Inagaki

(10) Patent No.: US 9,835,865 B2
(45) Date of Patent: Dec. 5, 2017

(54) VIDEO DISPLAY DEVICE AND HEAD-MOUNTED DISPLAY

(71) Applicant: KONICA MINOLTA, INC., Chiyoda-ku (JP)

(72) Inventor: Yoshihiro Inagaki, Chiyoda-ku (JP)

(73) Assignee: KONICA MINOLTA, INC., Tokyo (JP)

( * ) Notice: Subject to any disclaimer, the term of this patent is extended or adjusted under 35 U.S.C. 154(b) by 78 days.

(21) Appl. No.: 14/777,712

(22) PCT Filed: Mar. 11, 2014

(86) PCT No.: PCT/JP2014/056259
§ 371 (c)(1),
(2) Date: Sep. 16, 2015

(87) PCT Pub. No.: WO2014/156602
PCT Pub. Date: Oct. 2, 2014

(65) Prior Publication Data
US 2016/0274360 A1    Sep. 22, 2016

(30) Foreign Application Priority Data
Mar. 26, 2013   (JP) .................................. 2013-064580

(51) Int. Cl.
*G09G 5/00*        (2006.01)
*G02B 27/01*       (2006.01)
(Continued)

(52) U.S. Cl.
CPC ....... *G02B 27/0172* (2013.01); *G02B 5/0278* (2013.01); *G02B 5/3025* (2013.01);
(Continued)

(58) Field of Classification Search
CPC .................. G02B 27/0172; G02B 5/30; G02B 2027/0178
See application file for complete search history.

(56) References Cited

U.S. PATENT DOCUMENTS

2001/0033401 A1    10/2001  Kasai et al.
2002/0015114 A1*    2/2002  Okuyama .......... G02B 27/0172
                                                    349/5
(Continued)

FOREIGN PATENT DOCUMENTS

JP    2001-264682    9/2001
JP    2007-011279    1/2007
(Continued)

*Primary Examiner* — Nan-Ying Yang
(74) *Attorney, Agent, or Firm* — Cozen O'Connor

(57) ABSTRACT

A video display device includes: a display element displaying images by modulating light from an illumination optical system; and an eyepiece optical system guiding image light from the display element into an optical pupil. The illumination optical system includes: a light source including light emission points arranged substantially linearly; a diffuser plate diffusing illumination light from the light source in a first direction, in which the light emission points are arranged, but not in a second direction perpendicular to the first direction; and an optical element bending the illumination light such that the optical pupil and the light source are substantially conjugate. The optical element includes an illumination mirror, a reflection surface thereof having a non-zero curvature in all sections including a normal line at the optical-axis intersection. Here, the section perpendicular to the first direction has a different curvature from the section perpendicular to the second direction.

8 Claims, 4 Drawing Sheets

(51) Int. Cl.
*G02B 5/30* (2006.01)
*G02B 27/00* (2006.01)
*G02B 27/28* (2006.01)
*G02B 5/02* (2006.01)

(52) U.S. Cl.
CPC ..... *G02B 27/0018* (2013.01); *G02B 27/0176* (2013.01); *G02B 27/283* (2013.01); *G02B 2027/0112* (2013.01); *G02B 2027/0118* (2013.01); *G02B 2027/0123* (2013.01); *G02B 2027/0152* (2013.01); *G02B 2027/0174* (2013.01); *G02B 2027/0178* (2013.01)

(56) References Cited

U.S. PATENT DOCUMENTS

| | | |
|---|---|---|
| 2004/0233488 A1 | 11/2004 | Kasai et al. |
| 2006/0268421 A1* | 11/2006 | Shimizu .................. G02B 5/32 359/630 |
| 2010/0284070 A1 | 11/2010 | Shimizu et al. |
| 2011/0194163 A1 | 8/2011 | Shimizu et al. |

FOREIGN PATENT DOCUMENTS

| | | |
|---|---|---|
| JP | 2007-079298 | 3/2007 |
| JP | 2012013908 A * | 1/2012 |
| WO | WO 2010/044356 | 4/2010 |
| WO | WO 2010/061835 | 6/2010 |

* cited by examiner

VIDEO DISPLAY DEVICE AND HEAD-MOUNTED DISPLAY

RELATED APPLICATIONS

This is a U.S. National Phase Application under 35 USC 371 of International Application PCT/JP2014/056259 filed on Mar. 11, 2014.

This application claims the priority of Japanese application no. 2013-064580 filed Mar. 26, 2013, the entire content of which is hereby incorporated by reference.

TECHNICAL FIELD

The present invention relates to a video display device that allows an observer to observe, as a virtual image, an image displayed on a display element, and the present invention also relates to a head-mounted display (hereinafter also referred to as an HMD) including such a video display device.

BACKGROUND ART

In conventional video display devices that allow an observer to observe an image (a virtual image) by illuminating a display element by means of an illumination optical system and guiding image light from the display element via an eyepiece optical system to the observer's eye, an axisymmetric (rotational-symmetric) lens or a non-axisymmetric (non-rotation-symmetric) cylindrical mirror is adopted in the illumination optical system. An example of the configuration with an axisymmetric lens is disclosed in Patent Literature 1, for example, and an example of the configuration with a cylindrical mirror is disclosed in Patent Literature 2, for example.

As for a case where a linearly arranged plurality of light emission points (such as LEDs that emit red (R) light, green (G) light, and blue (B) light) are used as a light source, there is a technique for reducing unevenness in color by disposing a diffuser plate (a unidirectional diffuser plate) which diffuses light in the direction in which the light emitting points are aligned. In such a case, if an axisymmetric lens is used in the illumination optical system, a desirable configuration for more efficient use of light is such that an optical pupil formed by the eyepiece optical system and the light source are substantially conjugate with each other with respect to a direction in which the illumination light is not diffused by the diffuser plate. Thus, the curvature of the lens with respect to that direction is first determined, and then, based on this curvature, the curvature of the lens with respect to the direction in which the illumination light is diffused is dependently determined (since the lens is axisymmetric, this curvature is equal to the curvature determined with respect to the direction in which the illumination light is not diffused). On the other hand, in the case where a cylindrical mirror is used in the illumination optical system, the optical pupil and the light source are allowed to be substantially conjugate with each other by disposing the mirror such that it has a curvature in the direction in which the illumination light is not diffused by the diffuser plate and such that it does not have a curvature in the direction in which the illumination light is diffused by the diffuser plate.

CITATION LIST

Patent Literature

Patent Literature 1: Japanese Patent Application Publication No. 2001-264682 (see paragraph [0059], FIG. 15, etc.)

Patent Literature 2: Japanese Patent Application Publication No. 2007-11279 (see FIGS. 1, 3, and 4, etc.)

SUMMARY OF INVENTION

Technical Problem

Whether an axisymmetric optical system is used or a non-axisymmetric optical system is used in the illumination optical system, the curvature in a non-conjugate direction with respect to which the optical pupil and the light source are not conjugate with each other (that is, the direction in which illumination light is diffused) is dependently determined, and thus cannot necessarily be said to be in a preferable state. In particular, in the case where a cylindrical mirror is used in the illumination optical system, in the non-conjugate direction, illumination light diagonally incident on a reflection surface may sometimes be reflected from the reflection surface to depart from an optical path for illuminating the display element. Thus, in order to improve the efficiency of using the illumination light in the case where a mirror is adopted in the illumination optical system, it is preferable to independently set the curvature in the non-conjugate direction.

The present invention has been made to solve the above problem, and an object thereof is to provide a video display device that is configured such that light (illumination light) from a light source including a plurality of light emission points is reflected on an illumination mirror to be diffused by a diffuser plate in a diffusion direction, which is a direction in which the plurality of light emission points are arranged, and that is capable of improving light use efficiency both in the diffusion direction and in a direction perpendicular to the diffusion direction by setting curvatures of a reflection surface of the illumination mirror in the diffusion direction and in the direction perpendicular to the diffusion direction independently of each other, and an HMD including such a video display device.

Solution to Problem

According to one aspect of the present invention, a video display device includes an illumination optical system, a display element configured to display an image by modulating light from the illumination optical system, and an eyepiece optical system configured to guide image light from the display element to an optical pupil. Here, the illumination optical system includes a light source including a plurality of light emission points which are arranged substantially on a straight line, a diffuser plate configured to diffuse illumination light from the light source in a first direction in which the plurality of light emission points are arranged but not to diffuse the illumination light from the light source in a second direction which is perpendicular to the first direction, and an optical element configured to bend the illumination light such that, in an optical system from the optical pupil to the light source including the eyepiece optical system, the optical pupil and the light source are conjugate with each other with respect to the second direction. Here, the optical element includes an illumination mirror, a reflection surface of which has a curvature that is not zero in each of sections including a normal line at a point of intersection of the reflection surface with an optical axis such that, of the sections, a section perpendicular to the first direction and a section perpendicular to the second direction have different curvatures, the optical axis being an axis optically connecting a center of the optical pupil to a center of a display surface of the display element along with any extension line of the axis.

It is preferable that the curvature of the reflection surface of the illumination mirror be maximum in the section perpendicular to the first direction and minimum in the section perpendicular to the second direction.

It is preferable that the reflection surface of the illumination mirror have a shape whose sections perpendicular to the first direction all have a same curvature and are shifted from each other in the direction of the normal line according to positions thereof in the first direction, and that an amount of normal-line-direction shift of the sections perpendicular to the first direction be set such that principal rays at all angles of view in the first direction intersect each other substantially at one point when the principal rays at the all angles of view in the first direction are reversely traced from the center of the optical pupil toward the light source, neglecting diffusion performed by the diffuser plate.

According to another aspect of the present invention, an HMD includes the above-described video display device and a support member that supports the video display device in front of an eye of an observer.

Advantageous Effects of Invention

In a configuration where light from a light source including a plurality of light emission points is reflected on an illumination mirror and is then diffused by a diffuser plate in a first direction in which the light emission points are arranged, by setting the shape of the reflection surface of the illumination mirror as described above and setting the curvature of the reflection surface with respect to the first direction independently of the curvature with respect to the second direction which is perpendicular to the diffusion direction, it is possible to improve light use efficiency in the first direction, which is a non-conjugate direction, by the independent setting of curvature which allows efficient guiding of the illumination light to the display element, while improving light use efficiency in the second direction by setting the light source and the optical pupil to be substantially conjugate with each other with respect to the second direction.

DESCRIPTION OF EMBODIMENTS

Following hereinbelow is a description of an embodiment of the present invention, with reference being made to the accompanying drawings.

(Video Display Device)

Figure 1:
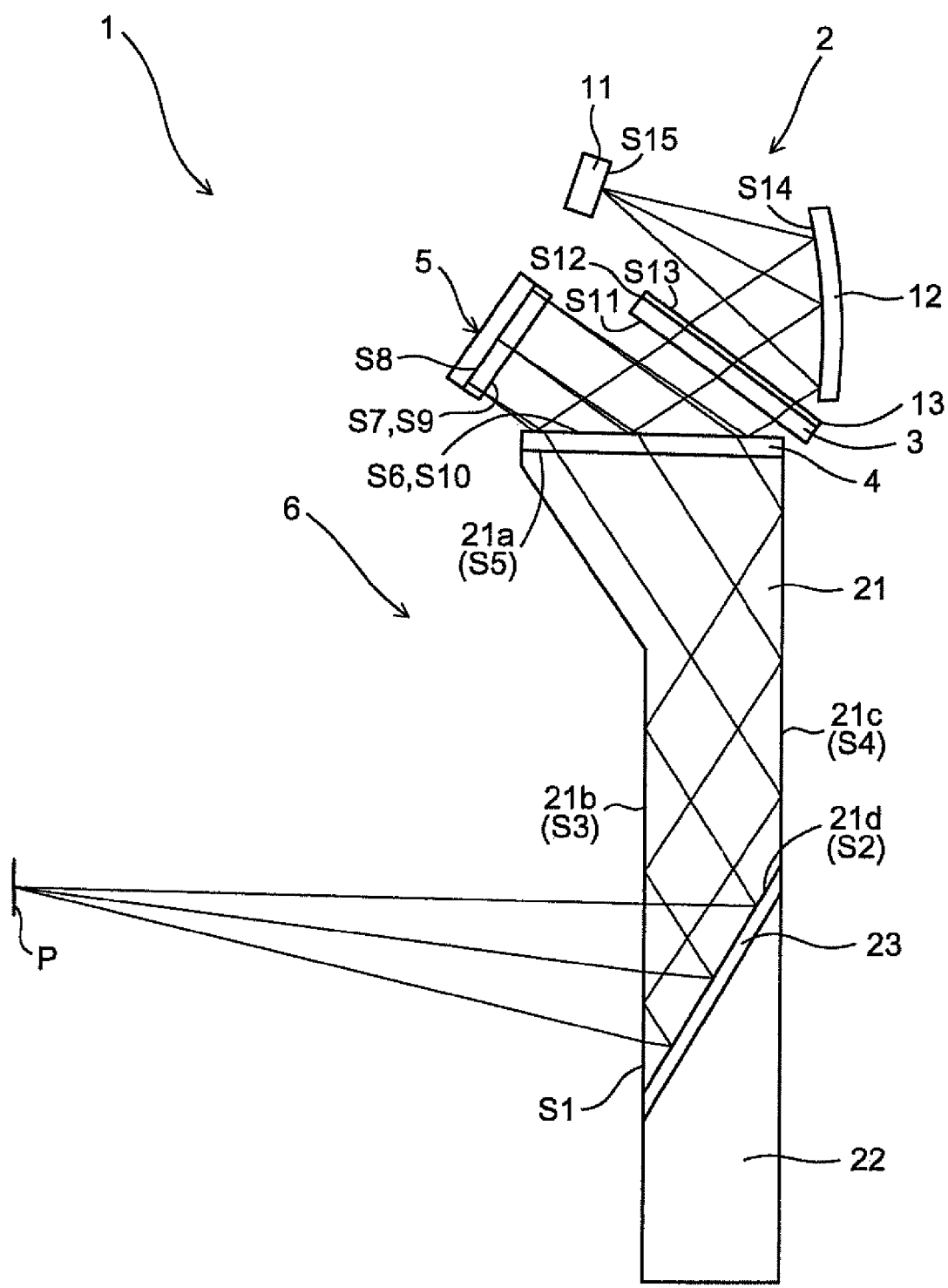
FIG. 1 is a sectional view schematically showing a configuration of a video display device according to an embodiment of the present invention.

FIG. 1 is a sectional view schematically showing a configuration of a video display device 1 of the present embodiment. The video display device 1 includes an illumination optical system 2, a polarizing plate 3, a polarizing beam splitter (PBS) 4, a display element 5, and an eyepiece optical system 6.

For convenience of description, directions are defined as follows. The axis which optically connects the center of the optical pupil P formed by the eyepiece optical system 6 to the center of the display surface of the display element 5, along with any extension line of that axis, is referred to as the optical axis. The direction perpendicular to the optical axis incidence plane of an HOE (holographic optical element) 23 in the eyepiece optical system 6 is referred to as the X direction (the first direction). The optical axis incidence plane of the HOE 23 refers to the plane that includes the optical axes of the light incident on and reflected from the HOE 23. A direction perpendicular to the X direction on a plane perpendicular to a surface-normal line at a point of intersection of an optical member with the optical axis is referred to as the Y direction (the second direction).

The illumination optical system 2 is provided to illuminate the display element 5, and includes a light source 11, an illumination mirror 12, and a diffuser plate 13.

The light source 11 includes an integrated RGB LED that emits light corresponding to R (red), G (green), and B (blue) colors. A plurality of light emission points (respective light emission points of R, 0, and B light) are arranged substantially on a straight line in a horizontal direction (the X direction). Wavelengths of light emitted from the light source 11 are, for example, in the ranges of 462±12 nm (B light), 525±17 nm (G light), and 635±11 nm (R light) as represented in terms of peak-light-intensity wavelength combined with half-peak-light-intensity wavelength width.

Figure 2:
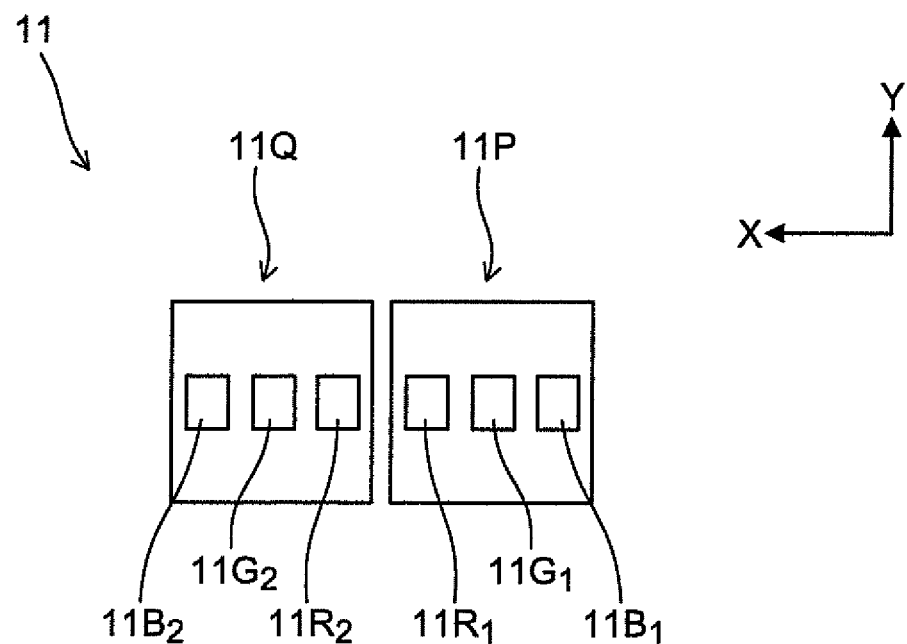
FIG. 2 is a plan view of a light source of the above-mentioned video display device.

FIG. 2 is a plan view of the light source 11. In this embodiment, the light source 11 includes two integrated RGB LEDs. The light emission points are arranged substantially on a straight line in the X direction such that, for each of R, G, and B light, the light emission points are located to be symmetrical with respect to the optical axis incidence plane of the HOE 23. More specifically, let the light source 11 include LEDs 11P and 11Q, the LED11P including LED11$R_1$, 11$G_1$, and 11$B_1$ which emit light of R, G, and B, respectively, the LED 11Q including LED11$R_2$, 11$G_2$, and 11$B_2$ which emit light of R, G, and B, respectively: the LEDs 11P and 11Q are arranged side by side in the X direction such that the light emission points are arranged in order of LED 11$B_1$, LED11$G_1$, LED11$R_1$, LED11$R_2$, LED11$G_2$, and LED11$B_2$ in the X direction. This arrangement helps make the intensity distribution of the RGB light symmetric in the X direction.

The illumination mirror 12 is an optical element that reflects the light (illumination light) emitted from the light source 11 toward the diffuser plate 13, and also bends the illumination light such that the optical pupil P and the light source 11 are substantially conjugate with each other with respect to the Y direction. A detailed description will be given later of the shape of a reflection surface of the illumination mirror 12.

The diffuser plate 13 is a unidirectional diffuser plate which diffuses incident light, for example, at 40° in the X direction, in which the plurality of light emission points of the light source 11 are arranged, but does not diffuse the incident light in the Y direction. The diffuser plate 13 is held at a surface of the polarizing plate 3.

The polarizing plate 3 transmits such part of light incident thereon via the diffuser plate 13 as has a predetermined polarization direction, and directs it to the PBS 4.

The PBS 4 is a flat plate-shaped polarizing beam splitter that reflects the light transmitted through the polarizing plate 3 toward the reflective display element 5, whereas the PBS 4 transmits such part of the light reflected from the display element 5 as corresponds to an ON-state of an image signal (light having a polarization direction that is orthogonal to that of the light transmitted through the polarizing plate 3). The PBS 4 is attached to a light incidence surface 21a of an eyepiece prism 21 in the eyepiece optical system 6. The eyepiece prism 21 will be described later.

By attaching the PBS 4 to the light incidence surface 21a, it is possible to arrange the optical members in a good balance on the light incidence and emergence sides of the PBS 4. This helps stabilize the holding positions of the optical members, and also allows a design where the display element 5 is arranged in a free space above the eyepiece optical system 6. Such a design allows efficient use of space, and is advantageous in view of size reduction. Furthermore, by attaching the PBS 4 to the eyepiece prism 21, it is possible to reduce the area of interface between the eyepiece prism 21 and air (the surface in direct contact with air), and thus to reduce surface reflection at the above-mentioned interface, whereby it is possible to achieve not only improvement in light use efficiency but also reduction of ghosts caused by surface reflection.

The display element 5 is a display element that displays an image by modulating light from the illumination optical system 2, and in this embodiment, the display element 5 includes a reflective liquid crystal display element. The display element 5 may include color filters, or may be configured to be driven on a time-division basis for each of R, G, and B.

The display element 5 is arranged such that light that is substantially perpendicularly incident thereon from the PBS 4 is substantially perpendicularly reflected therefrom toward the PBS 4. With this arrangement, it easier to achieve an optical design that offers improved resolution than with a configuration where light is incident at a large incidence angle with respect to a reflective display element. The display element 5 has a rectangular display surface, and is arranged such that the longitudinal direction of the display surface aligns with the X direction and that the shorter-side direction of the display surface aligns with the Y direction.

Furthermore, the display element 5 is arranged on the same side as the light source 11 with respect to an optical path from the illumination mirror 12 to the PBS 4. Thereby, the entire optical system from the illumination optical system 2 to the display element 5 can be configured compact. The display element 5 may be supported by the same substrate as that supporting the light source 11, or may be supported by a different substrate (in FIG. 1, no substrate supporting the light source 11 and the display element 5 is illustrated).

The eyepiece optical system 6 is an optical system for directing image light from the display element 5 to an observer's pupil (the optical pupil P), and has a non-axisymmetric (non-rotation-symmetric) positive optical power. The eyepiece optical system 6 includes the eyepiece prism 21, a deflection prism 22, and the HOE 23.

The eyepiece prism 21 guides, inside itself, the image light incident thereon from the display element 5 via the PBS 4, whereas the eyepiece prism 21 transmits the light of outside-world images (external light). The eyepiece prism 21 has a shape of a plane-parallel plate where an upper portion thereof is increasingly thicker toward an upper end and a lower portion thereof is increasingly thinner toward a lower end.

In the eyepiece prism 21, the surface to which the PBS 4 is attached is the light incidence surface 21a on which the image light from the display element 5 is incident, and two surfaces 21b and 21c located opposite to each other and substantially parallel to the optical pupil P are total reflection surfaces that guide the image light by total reflection. Of these two surfaces 21b and 21c, the surface 21b located closer to the optical pupil P than the surface 21c is serves also as an emergence surface through which the image light diffracted and reflected by the HOE 23 emerges from the eyepiece prism 21.

The eyepiece prism 21 and the deflection prism 22 are bonded together with adhesive, sandwiching therebetween the HOE 23, which is arranged at the lower end of the eyepiece prism 21. In this embodiment, among the surfaces of the eyepiece prism 21 except the surface 21d which is in contact with the HOE 23, ones that transmit the image light (namely the light incidence surface 21a and the surface 21b) are flat surfaces. In the present embodiment, the surface 21d, which is in contact with the HOE 23, is formed as a surface having a curvature in only one direction (the X direction, for example), but it may instead be formed as a flat surface.

The deflection prism 22 and the eyepiece prism 21 are bonded together via the HOE 23 to substantially form a plane-parallel plate. The bonding of the deflection prism 22 to the eyepiece prism 21 allows the deflection prism 22 to cancel refraction caused when external light passes through the wedge-shaped bottom end portion of the eyepiece prism 21, and this helps prevent distortion of observed outside-world images.

The HOE 23 is a volume-phase reflective hologram optical element that is disposed in contact with the eyepiece prism 21 and diffracts and reflects the image light guided inside the eyepiece prism 21. The HOE 23 diffracts (reflects) light in three wavelength ranges of, for example, in the ranges of 465±5 nm (B light), 521±5 nm (G light), and 634±0 nm (R light) as represented in terms of diffraction efficiency peak wavelength combined with half-diffraction efficiency wavelength width. Thus, the diffraction wavelengths of the HOE 23 for RGB substantially correspond to the wavelengths of the RGB image light (the emission wavelengths of the light source 11).

In the above-described configuration, the light outputted from the light source 11 in the illumination optical system 2 is reflected on the illumination mirror 12, to be then diffused only in the X direction by the diffuser plate 13, and then light with a predetermined polarization direction alone is transmitted through the polarizing plate 3. The light transmitted through the polarizing plate 3 is then reflected on the PBS 4 to be directed to be incident on the display element 5.

At the display element 5, the incident light is modulated according to an image signal. At this time, such image light as corresponds to an ON-state of the image signal emerges from the display element 5 after being converted into light having a polarization direction orthogonal to that of the incident light, and thus, this light is transmitted through the polarizing beam splitter 4 and enters the eyepiece prism 21 through the light incidence surface 21a. On the other hand, such image light as corresponds to an OFF-state of the image signal emerges from the display element 5 without having its polarization direction changed, and thus, this light is intercepted by the PBS 4 and thus does not enter the eyepiece prism 21.

Inside the eyepiece prism 21, the image light is totally reflected once on each of the two opposite surfaces 21c and 21b, and thereafter, the image light is incident on the HOE 23 to be diffracted and reflected thereon, and then the image light leaves the eyepiece prism 21 through the surface 21b to reach the optical pupil P. Thus, at the position of the optical pupil P, an observer can observe the image displayed on the display element 5 as a virtual image.

On the other hand, the eyepiece prism 21, the deflection prism 22, and the HOE 23 transmit almost all the outside light, allowing the observer to observe the outside-world image in a see-through manner. Thus, the virtual image of the image displayed on the display element 5 is observed in a manner superimposed on part of the outside-world image.

(Shape of Reflection Surface of Illumination Mirror)

In the present embodiment, the reflection surface of the illumination mirror 12 in the illumination optical system 2 is formed to have a curvature that is not zero in each of sections including the normal line at the point of intersection of the illumination mirror 12 with the optical axis such that, of the sections, the section perpendicular to the X direction and the section perpendicular to the Y direction have different curvatures. That is, the above-mentioned reflection surface has a curvature in any of the sections including the above-mentioned normal line, and the reflection surface is not rotation-symmetric with respect to the normal line; in these points, the illumination mirror 12 is different from a cylindrical mirror.

With this configuration of the reflection surface of the illumination mirror 12, with respect to the Y direction in which the illumination light is not diffused by the diffuser plate 13, it is possible to set the curvature of the reflection surface of the illumination mirror 12 such that the light source 11 and the optical pupil P are conjugate with each other, to thereby improve the light use efficiency with respect to the Y direction. With respect to the X, which is anon-conjugate direction, by setting the curvature in the X direction independently of the curvature in the Y direction, it is possible to allow the illumination light diagonally incident on the illumination mirror 12 in the X direction to be reflected thereon to be efficiently directed to the display element 5 (that is, it is possible to reduce deviation of the light reflected on the illumination mirror 12 from the optical path for illuminating the display element 5). Thus, the light use efficiency can be improved with respect to the X direction as well.

In short, by setting the curvatures of the reflection surface of the illumination mirror 12 with respect to the X direction and the Y direction independently of each other, it is possible to improve the light use efficiency of the illumination light in both the X and Y directions.

It is preferable for the curvature of the reflection surface of the illumination mirror 12 to be maximum in the section perpendicular to the X direction and minimum in the section perpendicular to the Y direction.

With the curvature set to be maximum in the section perpendicular to the X direction, it is possible to securely make the light source 11 and the optical pupil P conjugate with each other in the Y direction, to thereby improve the light use efficiency. Furthermore, with the curvature set to be minimum in the section perpendicular to the Y direction, it is possible to obtain the effect of improving the efficiency of using the illumination light in the X direction, with a minimum necessary curvature.

It is preferable that the reflection surface of the illumination mirror 12 have a shape whose sections perpendicular to the X direction all have a same curvature and are shifted from each other in the direction of the normal line according to positions thereof in the X direction, and that an amount of the normal-line direction shift of the sections perpendicular to the X direction be set such that principal rays at all angles of view in the X direction intersect each other substantially at one point when the principal rays at the all angles of view in the X direction are reversely traced from the center of the optical pupil P toward the light source 11, neglecting the diffusion performed by the diffuser plate 13.

Figure 3:
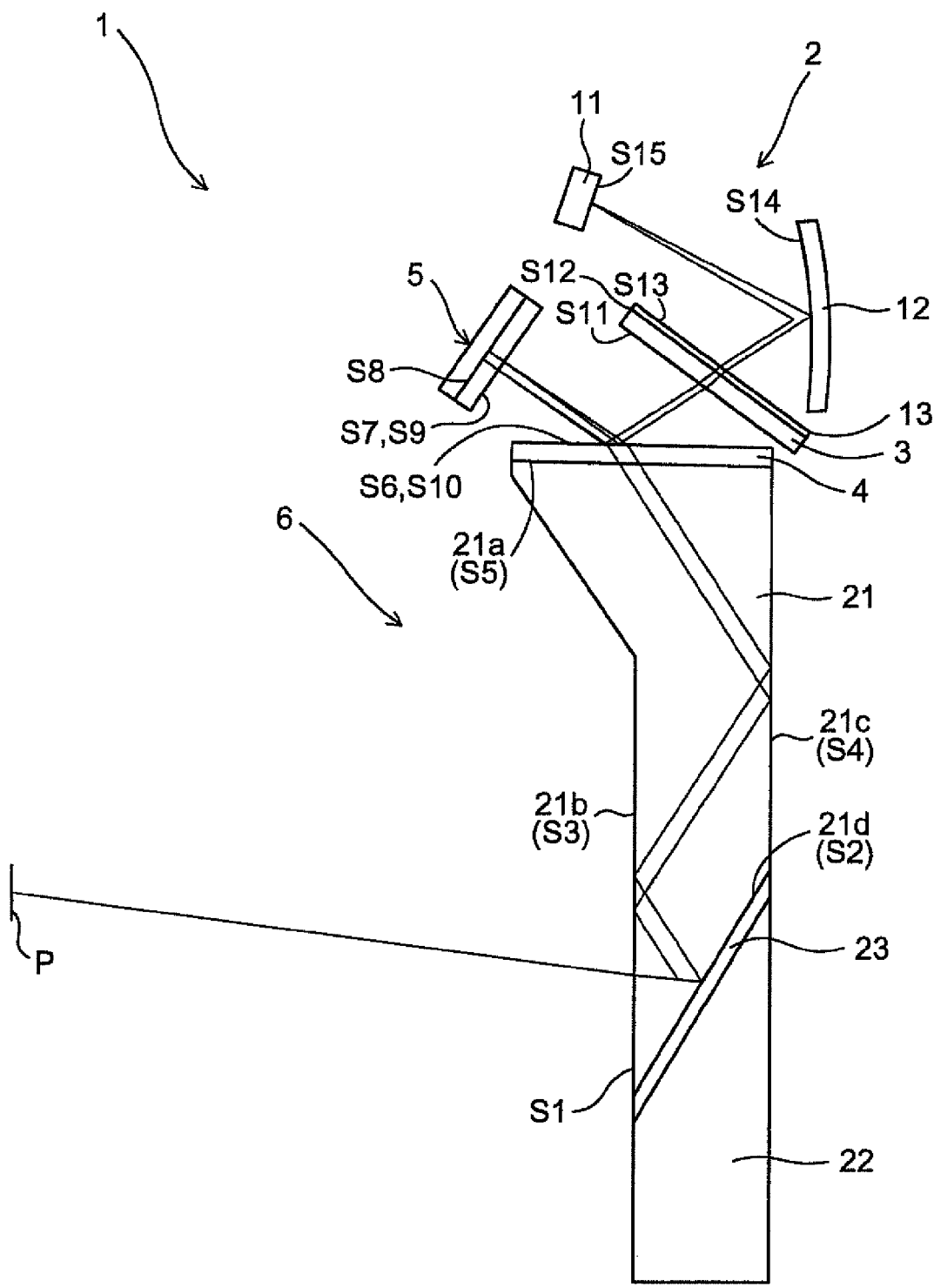
FIG. 3 is a diagram for illustrating light rays reversely traced from the optical pupil side in the above-mentioned video display device, with respect to the center and end parts of the angle of view in the X direction.

FIG. 3 is a diagram showing light rays with respect to the center and end parts of the angle of view in the X direction, each of the light rays being illustrated as a light ray (the principal ray at each angle of view) reversely traced from the optical pupil P side neglecting the diffusion of the light performed by the diffuser plate 13. For convenience' sake, FIG. 3 shows the light ray at the end parts of the angle of view as a light ray observed when the angle of view in the X direction is doubled. In the present embodiment, since the HOE surface (the surface 21d which is in contact with the HOE 23) and the reflection surface of the illumination mirror 12 each have a curvature in the X direction, the light ray at the end parts of the angle of view looks as if it were reflected from where the HOE surface or the reflection surface of the reflection mirror 12 does not exist, but the light ray is actually reflected on the HOE surface and the illumination mirror 12.

In FIG. 3, the light rays corresponding to the center and the end parts of the angle of view overlap with each other on the optical pupil P side and intersect each other at the light source 11. In the present embodiment, the HOE 23 is not a flat surface, while all the surfaces in the eyepiece optical system 6 are flat surfaces except the surface 21d, the light ray at the end parts of the angle of view reversely traced from the optical pupil P side is affected and caused by the curved HOE surface to depart from the light ray at the center of the angle of view after the HOE surface. Thereafter, since all the surfaces are flat surfaces except the HOE surface, the light rays at the center and the end parts of the angle of view remain apart from each other, but they can be made to coincide with each other at the light source 11 by appropriately curving the reflection surface of the illumination mirror 12 in the X direction.

That is, by setting the shape of the reflection surface of the illumination mirror 12 as described above, it is possible to maintain the positional relationship between the optical pupil P and the light source 11 in the Y direction at each angle of view in the X direction without inclining (twisting) the reflection surface of the illumination mirror 12. In the case where the reflection surface is twisted, installation error of the illumination mirror 12 has a great negative effect on the performance of the optical system, and thus, with the present embodiment, it is possible to reduce the degradation of the optical performance.

(HMD)

Figure 4:
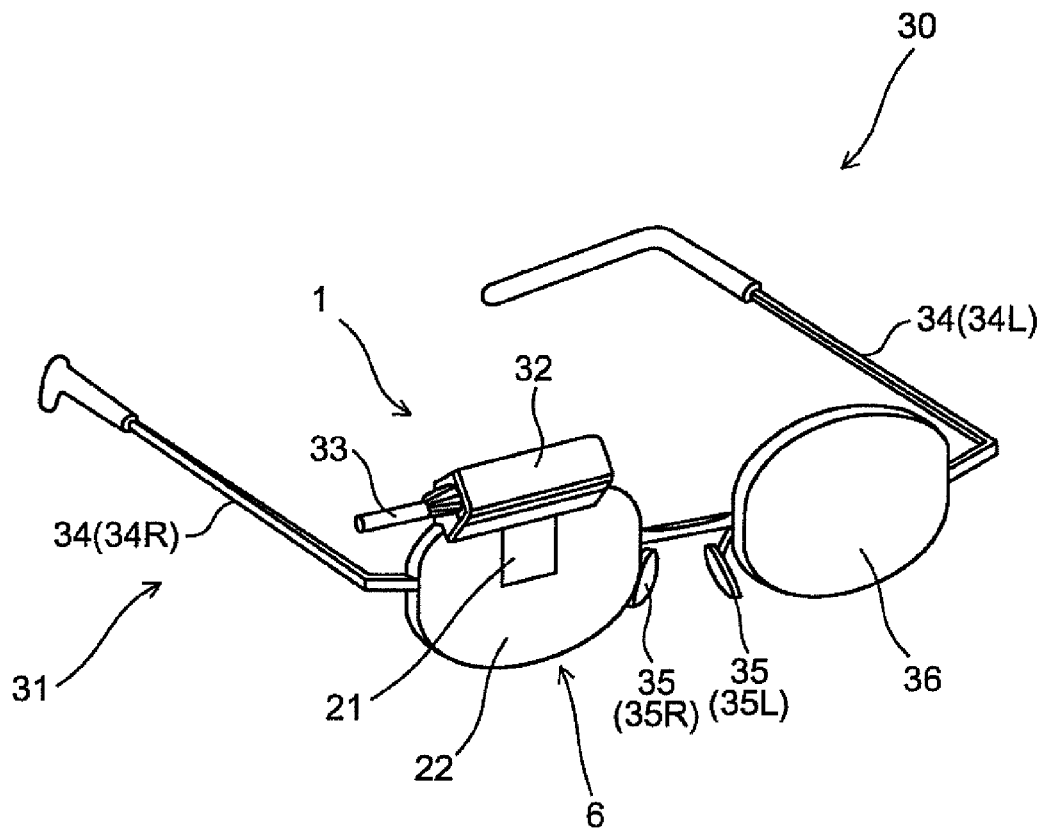
FIG. 4 is a perspective view schematically showing a configuration of an HMD provided with the above-mentioned video display device.

FIG. 4 is a perspective view schematically showing a configuration of an HMD 30 provided with the video display device 1 of the present embodiment. The HMD 30 includes the above-described video display device 1 and a support member 31.

The illumination optical system 2, the display element 5, etc. of the video display device 1 are accommodated in a housing 32, and the top end portion of the eyepiece optical system 6 is also located inside the housing 32. The eyepiece optical system 6 is formed by bonding together the eyepiece prism 21 and the deflection prism 22 as described above, and is shaped as a whole like one of lenses of eyeglasses (in FIG. 4, a right-eye lens). The light source 11 and the display element 5 inside the housing 32 are connected to an unillustrated circuit board via a cable 33 provided through the housing 32, so that driving electric power and image signals are supplied from the circuit board to the light source 11 and the display element 5.

The video display device 1 may be configured to further include an image pickup device capable of picking up static images and moving images, a microphone, a speaker, an earphone, etc., and to exchange (transmit/receive) information of picked-up and display images and sound information with an external server or an external terminal via a communication network such as the Internet.

The support member 31, which is a supporting mechanism corresponding to a frame of eyeglasses, supports the video display device 1 in front of an eye of an observer (in FIG. 2, in front of the right eye). The support member 31 includes temples 34 (a right temple 34R and a left temple 34L), which is adapted to abut on the right and left sides of the observer's head, and nose pads 35 (a right nose pad 35R and a left nose pad 35L), which are adapted to abut on the nose of the observer. The support member 31 also supports, in front of the left eye of the observer, a lens 36 as a dummy lens.

When the HMD 30 is mounted on the head of the observer and an image is displayed on the display element 5, the image light is directed via the eyepiece optical system 6 to the optical pupil. Accordingly, by placing his or her pupil at the position of the optical pupil, the observer can observe an enlarged virtual image of the image displayed by the video display device 1. Furthermore, the observer can simultaneously observe, via the eyepiece optical system 6, the outside-world image in a see-through manner.

Thus, by having the video display device 1 supported by the support member 31, it is possible to allow the observer to observe the image offered by the video display device 1 in a hands-free and thus stable manner for a long time. Here, two of such video display devices 1 may be used to allow the observer to observe the image with his or her both eyes.

EXAMPLE

Now, a numerical example of the video display device 1 shown in FIG. 1 will be described more specifically with reference to construction data, etc.

In the construction data shown below, Si (i=1, 2, 3, ...) represents the i-th surface from the optical pupil P side along the optical path from the light source 11 to the optical pupil P (with the image light emergence surface of the eyepiece prism 21 counted as the first surface). Thus, S2 represents the surface 21d of the eyepiece prism 21 (the HOE attachment surface), S3 represents the surface 21b (the total reflection surface (the same flat surface as S1)), S4 represents the surface 21c (the total reflection surface), S5 represents the surface 21a (the PBS attachment surface), S6 represents the transmission surface of the PBS 4, S7 represents the cover glass surface of the display element 5, S8 represents the liquid crystal surface of the display element 5, S9 represents the cover glass surface of the display element 5, S10 represents the reflection surface of PBS 4, S11 represents the emergence surface of the polarizing plate 3, S12 represents the interface between the polarizing plate 3 and the diffuser plate 13, S13 represents the incidence surface of the diffuser plate 13, S14 represents the reflection surface of the illumination mirror 12, and S15 represents the LED light emission surface of the light source 11.

The position of each surface Si is identified by surface data consisting of the coordinates (x, y, z) of its vertex and its rotation angle (ADE). The coordinates of the vertex of a surface. Si are given, with the vertex taken as the origin of a local rectangular coordinate system (X, Y, Z), in terms of the coordinates (x, y, z) of the origin of the local rectangular coordinate system (X, Y, Z) in a global rectangular coordinate system (x, y, z) (coordinates being given in mm). The inclination of a surface Si is given in terms of the angle of its rotation about its vertex with respect to the x axis (its x rotation). Rotation angles are given in degrees (°), a counterclockwise direction of rotation as seen from the positive side of the x axis (that is, as viewed from the near side toward the far side with respect to the sheet of FIG. 1) being the positive direction of the rotation angle of an x rotation.

Moreover, the global rectangular coordinate system (x, y, z) is an absolute coordinate system that coincides with the local rectangular coordinate system (X, Y, Z) of the emergence surface (S1). On the emergence surface (S1), the direction from the emergence surface (S1) toward the HOE 23 is a +Z direction, the upward direction with respect to the emergence surface (S1) is a +Y direction, and the direction perpendicular to the YZ flat plane and pointing from far side to near side of the sheet of FIG. 1 (the direction from left to right when the HMD is mounted) is a +X direction.

Moreover, the production wavelength (HWL; a normalized wavelength), at the time of fabrication, of the HOE used in the present example and its reproduction wavelength are both 532 nm, and the diffraction light used here is of order 1.

Moreover, in the present example, the HOE performs complicated wavefront reconstruction, and thus the HOE is defined by a phase function ϕ. The phase function ϕ is, as shown in formula (1) below, a generating polynomial (two-dimensional polynomial) with respect to the position on the HOE (X, Y). In formula (1), A (i, j) represents the coefficient (HOE coefficient) for $X^i Y^j$.

$$\phi = \Sigma\Sigma A(\ )(\ )X^i Y^j \qquad \text{[Formula 1] \#}$$

Moreover, in the construction data, the shape of the polynomial free-form curved surface is expressed by formula (2) below. Here, Z represents the amount of sag (mm) in the Z-axis direction (in the optical axis direction) at the position of coordinates (X, Y). A(i, j) represents the coefficient (free-form curved surface coefficient) for $X^i Y^j$. No part of formula (2) represents a spherical surface term.

$$z = \Sigma\Sigma A(\ )(\ )X^i Y^j \qquad \text{[Formula 2]}$$

Table 1 presents coordinates of each surface in the video display device 1 of the present example, and Tables 2 to 4 present, coefficients (HOE coefficients) A (i, j) for the phase function ϕ of the HOE, the shape formula coefficients of the HOE surface (the HOE attachment surface), and the shape formula coefficients of the illumination mirror with respect to the video display device 1, for different orders of X and Y, respectively. The shape formula coefficients of the HOE and the illumination mirror are given in terms of coefficients of the free-form curved surface given by formula (2). In Tables 2 to 4, different orders of X are given in the first row, and different orders of Y are given in the first column. Moreover, in all tables, any coefficient of an unlisted order equals zero, and "E-n" stands for "×10$^{-n}$".

TABLE 1

| SUR-FACE | | x | y | z | ADE (°) |
|---|---|---|---|---|---|
| S15 | LED LIGHT EMISSION SURFACE | 0.00 | 28.19 | −1.68 | 150.32 |
| S14 | ILLUMINATION MIRROR | 0.00 | 24.04 | 6.41 | 2.93 |
| S13 | DIFFUSER PLATE | 0.00 | 22.13 | 3.16 | 53.78 |
| S12 | INTERFACE BETWEEN POLARISING PLATE AND DIFFUSER PLATE | 0.00 | 21.93 | 3.02 | 53.78 |
| S11 | POLARISING PLATE | 0.00 | 21.36 | 2.60 | 53.78 |

TABLE 1-continued

| SURFACE | | x | y | z | ADE (°) |
|---|---|---|---|---|---|
| S10 | PBS REFLECTION SURFACE | 0.00 | 19.29 | 0.44 | −91.22 |
| S9 | LIQUID CRYSTAL COVER GLASS INCIDENCE SURFACE | 0.00 | 22.45 | −4.81 | −34.68 |
| S8 | LIQUID CRYSTAL SURFACE | 0.00 | 22.85 | −5.38 | 145.32 |
| S7 | LIQUID CRYSTAL COVER GLASS INCIDENCE SURFACE | 0.00 | 22.45 | −4.81 | 145.32 |
| S6 | PBS | 0.00 | 19.29 | 0.44 | 88.78 |
| S5 | PBS ATTACHMENT SURFACE | 0.00 | 18.59 | 0.42 | 88.78 |
| S4 | TOTAL REFLECTION SURFACE | 0.00 | 11.50 | 5.00 | 0.00 |
| S3 | TOTAL REFLECTION SURFACE (SAME FLAT SURFACE AS EMERGENCE SURFACE) | 0.00 | 4.00 | 0.00 | 180.00 |
| S2 | HOE SURFACE | 0.00 | −0.50 | 2.50 | −31.00 |
| S1 | EMERGENCE SURFACE | 0.00 | 0.00 | 0.00 | 0.00 |

TABLE 2

<HOE COEFFICIENTS>

| Y\X | 0 | 2 | 4 | 6 | 8 |
|---|---|---|---|---|---|
| 1 | 0.0000E+00 | 1.0929E−04 | −2.0337E−08 | 2.9047E−10 | −1.2125E−12 |
| 2 | −1.3770E−02 | −2.8925E−06 | 3.9495E−08 | −4.4937E−10 | 1.6690E−12 |
| 3 | 2.2715E−04 | 3.2085E−08 | 7.1422E−10 | −2.0575E−12 | 0.0000E+00 |
| 4 | −9.6669E−06 | 2.3061E−08 | −2.0714E−10 | 2.0210E−12 | 0.0000E+00 |
| 5 | −2.5603E−07 | −4.4426E−09 | −1.1721E−11 | 0.0000E+00 | 0.0000E+00 |
| 6 | 8.9449E−08 | −1.7840E−10 | 4.5787E−13 | 0.0000E+00 | 0.0000E+00 |
| 7 | 1.5597E−08 | 6.4702E−11 | 0.0000E+00 | 0.0000E+00 | 0.0000E+00 |
| 8 | −2.2360E−09 | −1.3842E−12 | 0.0000E+00 | 0.0000E+00 | 0.0000E+00 |
| 9 | −1.8977E−10 | 0.0000E+00 | 0.0000E+00 | 0.0000E+00 | 0.0000E+00 |
| 10 | 2.4227E−11 | 0.0000E+00 | 0.0000E+00 | 0.0000E+00 | 0.0000E+00 |

TABLE 3

<SHAPE FORMULA COEFFICIENTS OF HOE SURFACE>

| Y\X | 2 | 4 | 6 | 8 | 10 |
|---|---|---|---|---|---|
| 0 | −8.5942E−03 | −1.0800E−06 | −6.0420E−10 | 2.1902E−11 | −1.3449E−13 |

TABLE 4

<SHAPE FORMULA COEFFICIENTS OF ILLUMINATION MIRROR>

| Y\X | 0 | 2 |
|---|---|---|
| 0 | 0.0000E+00 | −1.2477E−02 |
| 2 | −2.5786E−02 | 0.0000E+00 |
| 3 | −5.5959E−04 | 0.0000E+00 |
| 4 | −8.5243E−06 | 0.0000E+00 |

Figure 5:
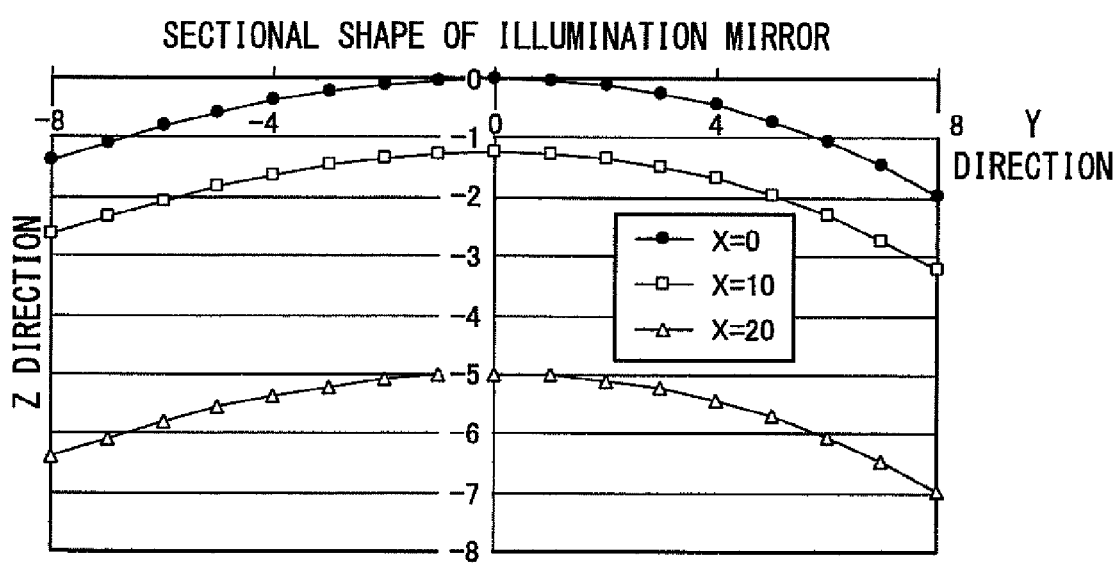
FIG. 5 is a graph showing a sectional shape of an illumination mirror of the above-mentioned video display device.

FIG. 5 shows the shape of the reflection surface of the illumination mirror in terms of sections (YZ section) when X=0, X=10, and X=20. In the present example, the formula expressing the shape of the reflection surface of the illumination mirror is a two-dimensional polynomial, and as listed in Table 4, the shape formula coefficients of the reflection surface of the illumination mirror are non-zero in terms of order 2 for X and of orders 2 to 4 for Y. When viewed within a plane parallel to the YZ plane, due to the absence of a term multiplied by X and Y in the surface shape formula, the sectional shapes are the same regardless of the values of X. Moreover, due to the presence of terms of order 2 for X, when the value of X is changed, the sectional shape shifts in the direction of the Z axis (direction of the normal line at the intersection with the optical axis).

With the reflection surface of the illumination mirror having such a shape, it is possible to bend the illumination light such that the light source and the optical pupil are conjugate with each other with respect to the Y direction, to thereby improve the light use efficiency. With respect to the X direction as well, by setting the curvature independently of that in the Y direction, it is possible to have the illumination light diagonally incident on the reflection surface bent thereby to efficiently guide the illumination light to the display element 5, to thereby improve the light use efficiency.

In a case where the curvature of the illumination mirror (the reflection surface) in a non-conjugate direction (the X direction) cannot be set, it is necessary to incline (twist) the reflection surface to allow light rays at different angles of view in the X direction reversely traced from the optical pupil side to intersect each other at the light source. Introduction of a term multiplied by X and Y into the surface shape formula would make it possible to change the inclination of the reflection surface, but it would amplify the negative effect the installation error of the mirror has on the performance. Thus, specifying the shape of the reflection surface without introducing a term multiplied by X and Y into the surface shape formula as in the present example is more advantageous with respect to the optical performance.

In this example, as shown in Table 3, the shape formula coefficients of the HOE surface are non-zero in terms of order 0 for Y and of even orders for X (in the range from 2 to 10), and are zero in all terms of order non-zero for Y. Thus, the HOE surface has a curvature in the X direction, but has no curvature in the Y direction. The shape of the reflection surface of the illumination mirror as presented by the present embodiment is applicable not only to a case where the HOE surface has a curvature only in one direction but also, needless to say, to a case where the HOE surface is a flat surface, and thereby the same advantage as the present embodiment can be achieved.

Supplementary Notes

The video display device presented in the present embodiment may have the following configurations as well:

(1) A video display device includes:

a polarizing plate that transmits such part of light from an illumination optical system as has a predetermined polarization direction; and a polarizing beam splitter that on one hand reflects the light transmitted through the polarizing plate toward a reflective liquid crystal display element as a display element and that on the other hand transmits such part of light reflected from the reflective liquid crystal display element as has a polarization direction orthogonal to that of incident light (that is, light that corresponds to an ON-state of an image signal), the polarizing beam splitter being attached to a light incidence surface of an eyepiece prism.

(2) An eyepiece optical system includes:

an eyepiece prism that guides image light inside itself; and an HOE that is disposed in contact with the eyepiece prism and that diffracts and reflects the image light guided inside the eyepiece prism, an HOE surface having a curvature only in an X direction.

The HMD presented in the present embodiment may be configured such that the above-described video display device is supported by a support member.

INDUSTRIAL APPLICABILITY

The video display device is usable in an HMD.

LIST OF REFERENCE SIGNS 1 video display device
2 illumination optical system
5 display element
6 eyepiece optical system
11 light source
11P, $11R_1$, $11G_1$, $11B_1$ LED (light source, light emission point)
11Q, $11R_2$, $11G_2$, $11B_2$ LED (light source, light emission point)
12 illumination mirror (optical element)
13 diffuser plate
30 HMD (head mounted display)
31 support member
P optical pupil

The invention claimed is:

1. A video display device comprising:
an illumination optical system;
a display configured to display an image by modulating light from the illumination optical system; and
an eyepiece optical system configured to guide image light from the display to an optical pupil,
wherein the illumination optical system includes:
   a light source including a plurality of light emission points which are arranged substantially on a straight line,
   a diffuser plate configured to diffuse illumination light from the light source in a first direction in which the plurality of light emission points are arranged but not to diffuse the illumination light from the light source in a second direction which is perpendicular to the first direction, and
   an optical mirror configured to bend the illumination light such that, in an optical system from the optical pupil to the light source including the eyepiece optical system, the optical pupil and the light source are substantially conjugate with each other with respect to the second direction,
wherein the optical mirror includes an illumination mirror, a reflection surface of which has a curvature that is not zero in each of sections including a normal line at a point of intersection of the reflection surface with an optical axis such that, of the sections, a section perpendicular to the first direction and a section perpendicular to the second direction have different curvatures, the optical axis being an axis optically connecting a center of the optical pupil to a center of a display surface of the display along with any extension line of the axis,
wherein the reflection surface of the illumination mirror has a shape whose sections perpendicular to the first direction all have a same curvature and are shifted from each other in the direction of the normal line according to positions thereof in the first direction, and
wherein an amount of normal-line-direction shift of the sections perpendicular to the first direction is set such that principal rays at all angles of view in the first direction intersect each other substantially at one point when the principal rays at the all angles of view in the first direction are reversely traced from the center of the optical pupil toward the light source, neglecting diffusion performed by the diffuser plate.

2. The video display device according to claim 1, wherein the curvature of the reflection surface of the illumination mirror is maximum in the section perpendicular to the first direction and minimum in the section perpendicular to the second direction.

3. The video display device according to claim 1, wherein the eyepiece optical system includes an eyepiece prism configured to guide the image light from the display inside the eyepiece prism.

4. The video display device according to claim 3, further comprising:
a first polarizing element configured to polarize the illumination light from the illumination optical system; and
a second polarizing element configured to reflect the illumination light from the first polarizing element toward the display, and to transmit the image light from the display,
wherein the display is a reflective liquid crystal display.

5. The video display device according to claim 4, wherein the second polarizing element is attached to a light incidence surface of the eyepiece prism.

6. A head-mounted display comprising:
the video display device according to claim 1; and
a support member that supports the video display device in front of an observer's eye.

7. The video display device according to claim 6, wherein the eyepiece optical system includes a hologram optical mirror configured to diffract and reflect the image light guided inside the eyepiece optical mirror, and the hologram optical mirror has a curvature only in the first direction.

8. A head-mounted display comprising:
the video display device according to claim 5; and
a support member that supports the video display device in front of an observer's eye.

* * * * *